UNITED STATES PATENT OFFICE.

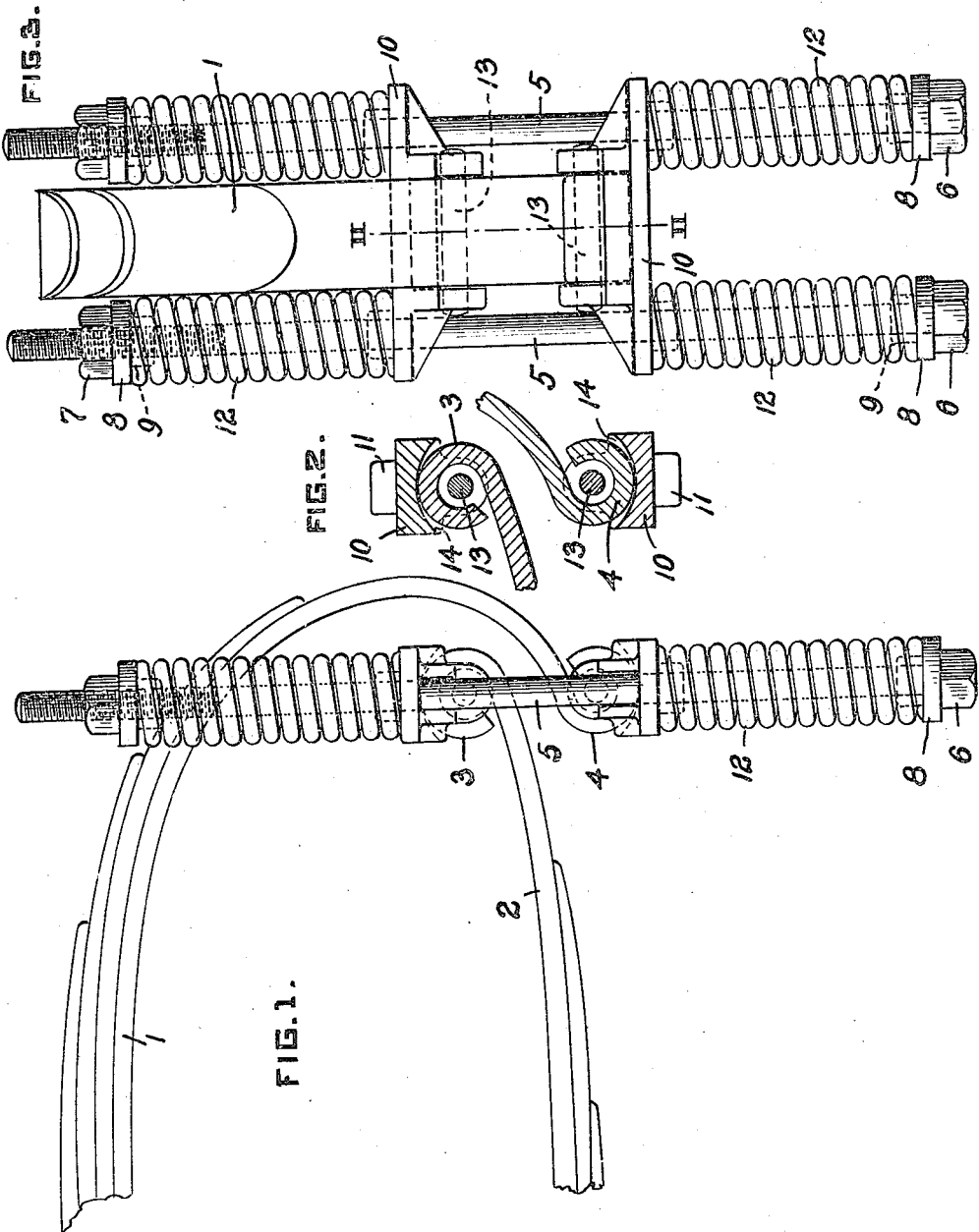

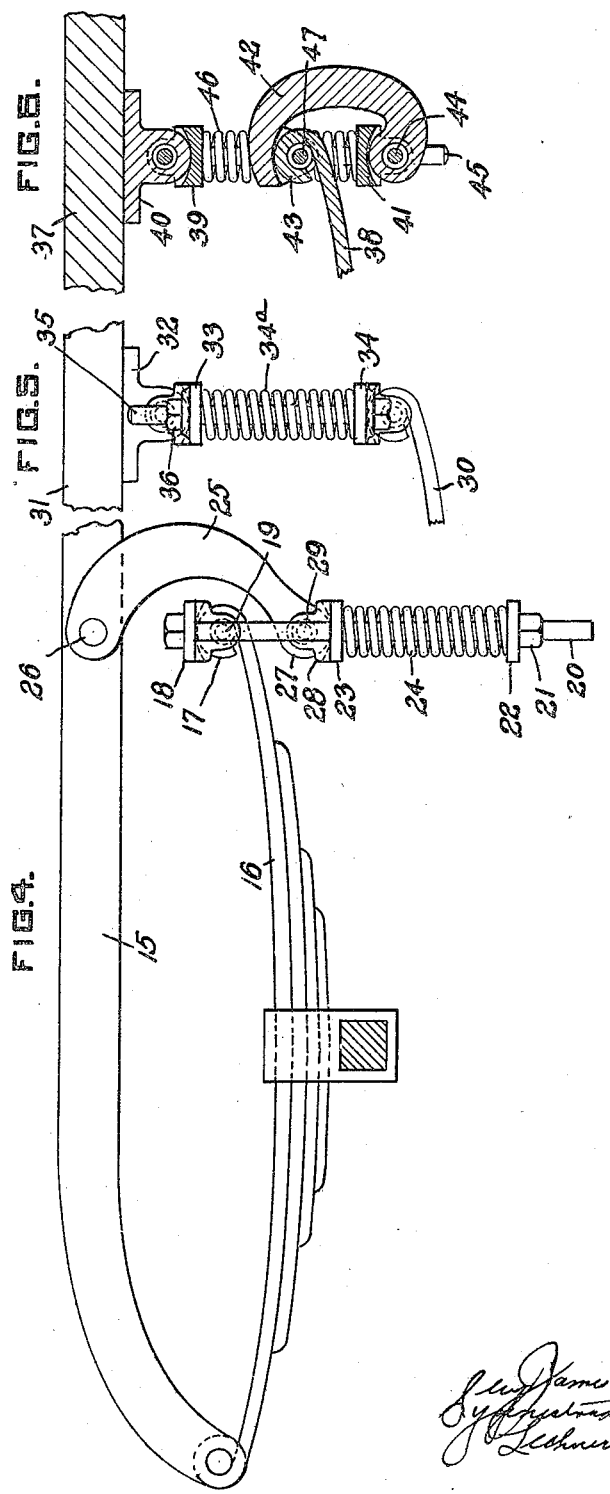

JAMES E. KEY, OF PITTSBURGH, PENNSYLVANIA.

SHOCK-ABSORBER.

1,243,305.

Specification of Letters Patent.

Patented Oct. 16, 1917.

Application filed February 17, 1916. Serial No. 78,816.

*To all whom it may concern:*

Be it known that I, JAMES E. KEY, a citizen of the United States, residing at Pittsburgh, in the county of Allegheny and State of Pennsylvania, have invented certain new and useful Improvements in Shock-Absorbers, of which the following is a specification.

The invention relates to shock absorbers designed particularly for use in connection with automobile springs, but useful in other relations also. The invention has for its primary objects the provision of a shock absorber, (1) which is of cheap simple construction, (2) which can be readily applied and adjusted to meet widely varying conditions, (3) which is applicable to practically all types of automobiles as now constructed, and (4) in which an improved and practically noiseless type of connection is provided between the device and the spring or springs with which it is used. Certain embodiments of the invention are illustrated in the accompanying drawings, wherein—

Figure 1 is a side elevation of one embodiment of the invention, Fig. 2 is a vertical section on the line II—II of Fig. 1, Fig. 3 is an end elevation of the construction of Fig. 1, Fig. 4 is a side elevation of another embodiment of the invention, Fig. 5 is a side elevation of a modification involving a departure from the arrangement of Fig. 4, and Fig. 6 is still another modification of the structures of Figs. 4 and 5.

In the construction of Figs. 1, 2 and 3 the reference numerals 1 and 2 indicate the ordinary leaf springs of a vehicle with their bent ends 3 and 4 in the usual relation as indicated in Fig. 2. Lying outside of the springs are the bolts 5 provided at their lower ends with the heads 6 and at their upper ends with the nuts 7. Spring engaging members 8 are mounted on the bolts above the heads 6 and below the nuts 7, such members having parts 9 projecting inside the springs to prevent lateral movement of the springs with respect to the bolts. Mounted slidably upon the bolts 5 adjacent their central portions are the bearing blocks 10 having projecting portions 11 corresponding to the portions 9 on the engaging members 8. Interposed between the members 8 and 10 are the coil springs 12, the nuts 7 being adjusted to place these springs under compression.

The bearing blocks 10 are provided with transverse pins 13 lying inside the curved ends 3 and 4 of the springs but out of contact with such ends as indicated in Fig. 2. The faces of the bearing blocks 10 are recurved as indicated at 14 (Fig. 2), and the curved portions of the springs engage these surfaces 14. The radius of curvature of the surfaces 14 is greater than that of the ends of the springs so that the contacting area is reduced. As a result the relative motion of the two contacting parts is a rolling one and the friction and consequent noise incident to the relative movement is reduced to a minimum. The pin 13 is used as a safeguard to prevent the spring ends from becoming displaced with respect to the bearing blocks. The construction is applicable to the ordinary spring arrangement and the nuts 7 permit the adjustment of the tension of the springs to meet varying conditions of load.

Fig. 4 illustrates the application of the invention in a modified form to the forward spring arrangement as commonly employed upon a motor car, 15 being the frame member and 16 being the leaf spring having its end 17 curved and corresponding to the ends 3 and 4 as shown in Fig. 2. Mounted upon the end 17 for rocking movement is a bearing block 18, such bearing block having its bearing surface curved to provide for a rocking movement the same as in the construction of Fig. 1. A pin 19 is employed corresponding to the pins 13 in Fig. 3, and a pair of bolts 20 extend through the bearing block 18 and lie on opposite sides of the spring 16. The lower ends of the bolts are provided with nuts 21 screw-threaded upon the bolts and supporting spring engaging members 22. Mounted slidably upon the bolts 20 is a second bearing block 23 between which block and the members 22 are interposed the springs 24. The downward thrust of the frame member 15 is transmitted to the bearing block 23 by means of the curved arm 25 pivoted to the member 15 at 26 and having its lower end 27 in rocking engagement with the upper surface 28 of the bearing block 23. A pin 29 carried by the bearing block 23 and extending through the lower end of the arm 25 prevents the accidental disengagement of the arm and bearing block, the opening through the arm in which the pin 29 is mounted being of larger diameter than the pin, so that actual contact is avoided.

Fig. 5 illustrates a modification of the structure of Fig. 4, which arrangement does away with the necessity of using the arm 25 of Fig. 4 but requires a greater distance between the end of the spring 30 and the frame member 31. A bracket 32 carries the bearing member 33 which member corresponds in its bearing relation and method of attachment to that of the member 23 heretofore described in connection with Fig. 4. The lower bearing block 34 corresponds in construction to that of the bearing block 18 of Fig. 4 and the method of pivoting the block and spring end together is the same as in the construction of Fig. 4. A pair of bolts 35 extend slidably through the bearing blocks 33 and 34, and through the springs 34ª, their upper ends being provided with the nuts 36.

Fig. 6 illustrates still another modification somewhat similar to that of Fig. 5 wherein means are provided for getting the frame member 37 and spring 38 closer together than in the construction of Fig. 5. The upper bearing member 39 is attached to the bracket 40, following the construction of Fig. 5, but the lower bearing block 41 is suspended from the spring end by means of the arm 42, the upper end of the arm resting upon the top of the spring end 43 and the lower end of the arm fitting beneath the bearing block 41 and being loosely pivoted thereto by means of the pin 44. A pair of bolts 45 are employed extending through springs 46 lying on either side of the arm 45, the bolts being provided with nuts and heads as in the other forms of construction. A pin 47 is carried by the arm 42 and lies in the spring end. Still other modifications might be made without departing from the spirit of the invention.

What I claim is:

1. In combination, a pair of leaf springs having their ends bent to form convex bearing surfaces, opposing rocking members mounted so as to turn with rolling friction on such spring ends, loose pivot pins in the ends of the springs connecting them to the rocking members, and a tension rod on each side of the springs extending through the ends of the rocking members and connected thereto.

2. The combination with a pair of opposing vehicle members, one of which is a leaf spring having its end curved, of a coil spring for taking the thrust between the members as they approach and a bearing member taking the pressure of the spring and having a curved surface engaging the curved end of the spring, the curved surface on the bearing member having a larger radius of curvature than the bearing surface on the end of the spring.

3. The combination with a pair of opposing vehicle members, one of which is a leaf spring having its end curved to form a loop, of a coil spring between the members, a bearing member therefor, a loose pivot connection between the bearing member and the bent end of the spring, and a concave surface on the bearing member in rocking engagement with outer surface of the curved spring end, the curved surface on the bearing member having a larger radius of curvature than the bearing surface on the end of the spring.

4. The combination with a pair of opposing vehicle members, a pair of bearing members carried by the members having loose pivot connections with the members and having curved surfaces in rocking engagement with said members, and spring means interposed between the members resisting their approach.

5. The combination with a pair of opposing vehicle members, a pair of bearing members carried by said vehicle members having loose pivot connections with the vehicle members and having curved surfaces in rocking engagement with said vehicle members, and a tension connection between said bearing members.

6. The combination with a pair of opposing vehicle members, a pair of bearing members carried by the vehicle members having loose pivot connections with such vehicle members and having curved surfaces in rocking engagement with said vehicle members, and spring means interposed between the vehicle members resisting their approach, the rocking surfaces of the vehicle members and those of the bearing members having different radii of curvature to provide for rolling friction between the surfaces.

7. The combination with a pair of opposing leaf springs having their ends curved to provide bearing surfaces, a pair of bearing members having loose pivot connections with said spring arms and having curved surfaces in rocking engagement with said spring arms, and a spring means interposed between the springs resisting their approach, the curved surfaces of the spring ends and those of the bearing members having different radii of curvature to permit of rolling friction between the surfaces, and the loose pivot connections permitting such rolling action.

JAMES E. KEY.

Copies of this patent may be obtained for five cents each, by addressing the "Commissioner of Patents, Washington, D. C."